Patented June 3, 1941

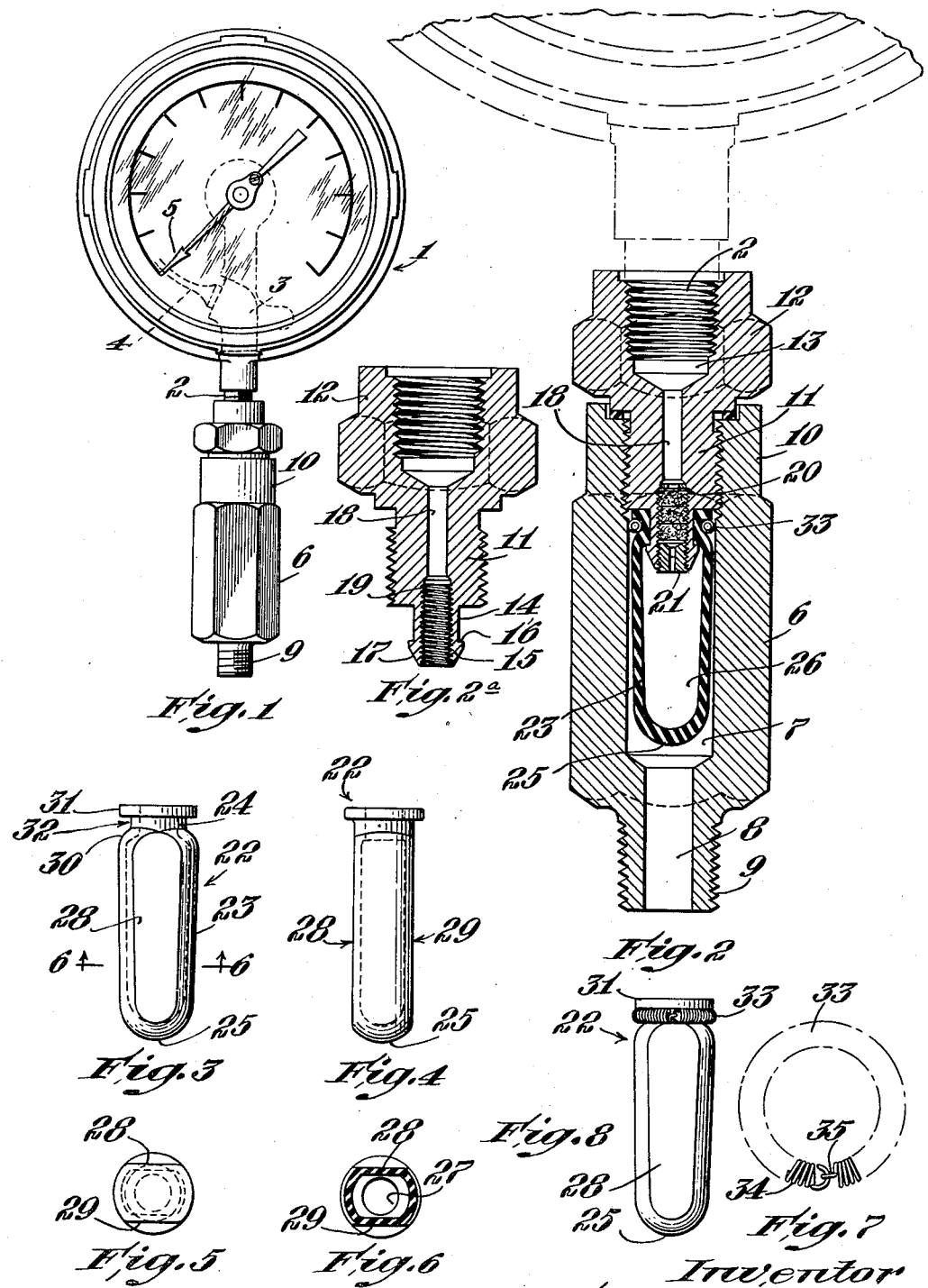

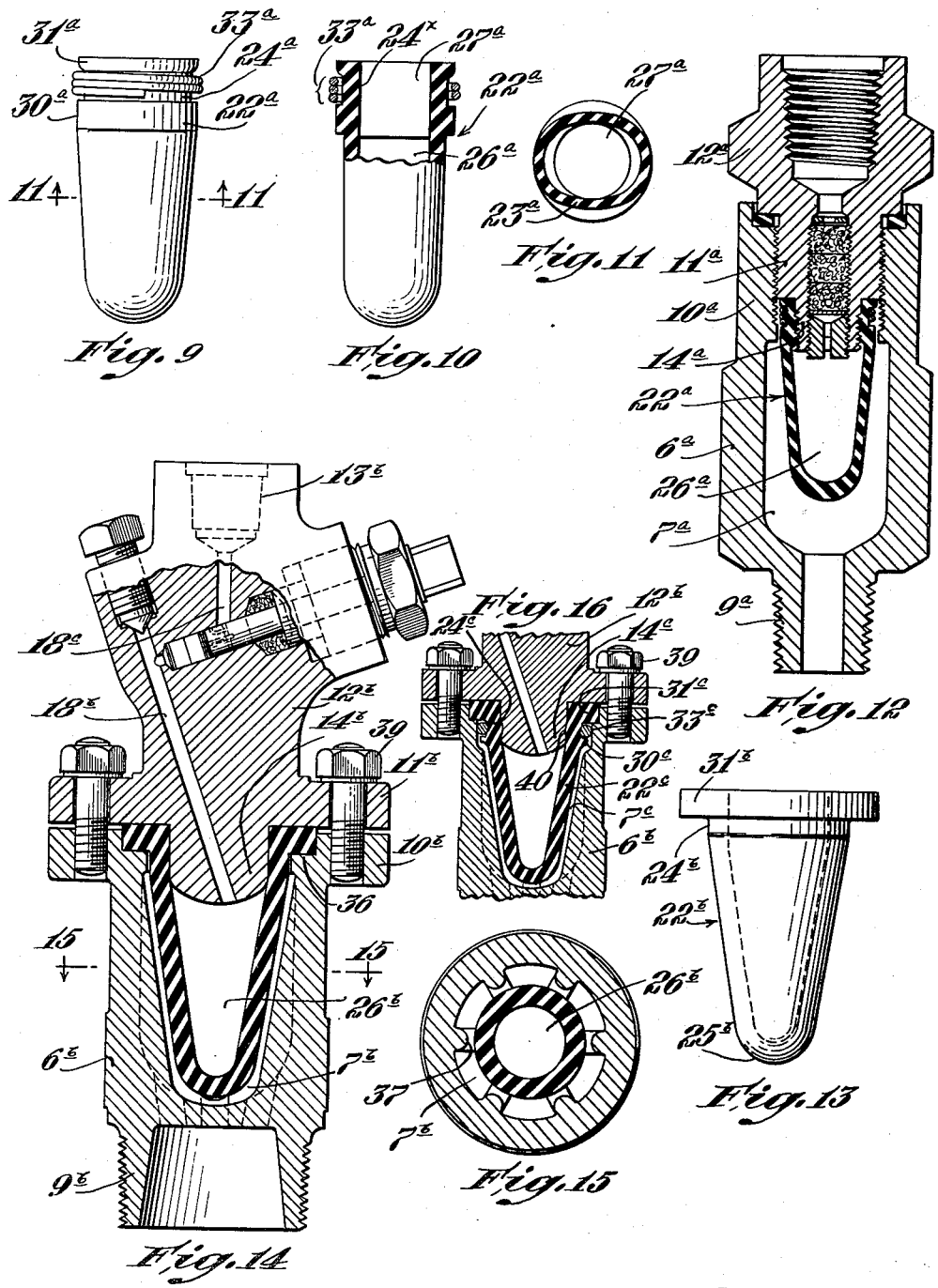

2,244,335

UNITED STATES PATENT OFFICE 2,244,335

GUARD DEVICE FOR PRESSURE RESPONSIVE INSTRUMENTS

Frank H. Hopkins, Fairfield, Conn., assignor to Manning, Maxwell & Moore, Incorporated, New York, N. Y., a corporation of New Jersey Application December 14, 1939, Serial No. 309,156

13 Claims. (Cl. 73—109)

This invention pertains to guard devices for pressure gauges or the like wherein a hollow pressure-sensitive element, for example a Bourdon tube, moves in response to variations in pressure of a fluid which fills the interior of the pressure-sensitive element.

In my copending application for Letters Patent Serial No. 134,312, filed April 1, 1937, I pointed out that when the pressure fluid, for example a chemical substance, is of a corrosive nature or contains solids in suspension—for example when the fluid is muddy water, it is not permissible to allow the fluid to enter the instrument, since the accuracy and usefulness of the latter would soon be destroyed by the action of the fluid or the suspended solids upon the sensitive and delicate parts of the apparatus. It was further pointed out that to avoid the above difficulty it has heretofore been proposed to interpose an impervious barrier (for example, a flexible diaphragm of a material not easily injured by the pressure fluid) between the pressure-sensitive element of the instrument and the pressure fluid supply, but it was further pointed out that diaphragms or like devices are not desirable under all conditions, in particular when dealing with the high pressures commonly encountered in modern engineering practice, for instance, pressures of the order of from 5,000 to 15,000 pounds per square inch.

As more fully disclosed in said application, it has been found possible by attaching a "pressure flask" to the inlet of the instrument and completely filling the system, including the pressure flask and the fluid-receiving cavities of the instrument with a mobile liquid, for instance oil, to obtain accurate readings of the instrument merely by exposure of the exterior surface of the pressure flask to the pressure fluid, although the pressure fluid itself is not permitted to enter the instrument. Such a pressure flask, as compared with a diaphragm or like device previously proposed, occupies but little space and may easily be concealed within the fitting or support for the instrument and may be made to withstand any pressure which is encountered in the engineering practice.

In the aforesaid application a pressure flask of thin resilient metal was disclosed as one desirable construction and which is useful for most purposes. However, when dealing with pressure fluids of certain types, a metal pressure flask is not altogether desirable. For instance, when the pressure fluid is mud, sludge or other fluid containing gritty particles, a metal flask is rapidly eroded by the abrasive action of the moving grit. For such use it has been found that a pressure flask of non-metallic material, for instance a material having the general characteristics of rubber, is far more durable than metal. However, when the pressure fluid not only contains grit but also contains oil or petroleum, as frequently happens in the oil fields, the use of rubber as a pressure flask is not practicable since it rapidly deteriorates in the presence of oil.

Furthermore, while it is readily possible to connect a metal pressure flask as by brazing, welding, soldering or the like to the instrument stem or associated part so as to provide a reliable leak-tight joint, it is not always easy to form such a joint between the instrument and a pressure flask of a resiliently yieldable material having the general physical characteristics of rubber. In this connection it may be observed that when a flask of rubber-like character is employed, it is often necessary to make the wall of the flask of substantial thickness in order to withstand the pressure imposed. However, when the wall is of substantial thickness, the application of pressure tends to compress the wall and thus reduce its thickness so that although initially firmly clamped between rigid clamping elements, such decrease in wall thickness by the applied pressure may develop leaks between the clamping elements and the flask.

Among the objects of the present invention is to provide a flask which will withstand the action of abrasives without rapid deterioration; to provide a pressure flask which will also withstand the effects of oil so that the flask may be used, for example, in the oil fields or oil refineries; to provide a pressure flask which may be made cheaply and easily and which may readily be applied to existing gauges or like instruments without modification of the latter; to provide a pressure flask of such shape and contour as to permit it readily to be cleaned; to provide a pressure flask which will respond sensitively and accurately to imposed pressures; to provide a pressure flask of such volumetric capacity and elasticity as to enable the device to function even though the enclosed space be partly filled with air; and to provide means for securing the pressure flask to the instrument with which it is associated so that even at high pressure no leak will develop between the flask and its support.

Other and further objects and advantages of the invention will be pointed out in the following more detailed description and by reference to the accompanying drawings, in which Fig. 1 is a front elevation of a pressure gauge having associated therewith the improved guard device of the present invention;

Fig. 2 is a vertical section, to larger scale than Fig. 1, the gauge being broken away and indicated in broken lines;

Fig. 2ª is a vertical section of an adapter device forming a part of the combination shown in Fig. 2;

Fig. 3 is a front elevation of one desirable form of pressure flask made in accordance with the present invention;

Fig. 4 is an edge elevation of the pressure flask of Fig. 3;

Fig. 5 is a bottom plan view of the pressure flask of Fig. 3;

Fig. 6 is a section on the line 6—6 of Fig. 3;

Fig. 7 is a plan view, to large scale, of a constrictive ring constituting a desirable element of means for uniting the flask to the gauge;

Fig. 8 is a front elevation showing the ring of Fig. 7 assembled with the pressure flask of Fig. 3;

Fig. 9 is a front elevation, to large scale, of a pressure flask of modified construction;

Fig. 10 is an edge elevation, partly in vertical section, of the flask of Fig. 9;

Fig. 11 is a section on the line 11—11 of Fig. 9;

Fig. 12 is a section, generally similar to Fig. 2, showing the pressure flask of Fig. 9 associated with a modified form of adapter;

Fig. 13 is a front elevation of a pressure flask of further modified construction;

Fig. 14 is a vertical section, partly in elevation, showing the flask of Fig. 13 assembled with an adapter of a further modified construction;

Fig. 15 is a section on the line 15—15 of Fig. 14; and

Fig. 16 is a view generally similar to Fig. 14, but illustrating a further modification.

Referring to the drawings, the numeral 1 designates a pressure gauge of a conventional type herein chosen as illustrative of a class of instruments with which the device of the present invention may be usefully associated. However, it is to be understood that instruments other than pressure gauges fall within this class and that when reference is herein made to a "pressure gauge" such reference is merely for convenience in description and is not to be regarded as limiting.

As illustrated in Fig. 1, the instrument or gauge 1 has the supporting stem or nipple 2 which is externally screw threaded and which forms a part of a fitting 3 fixedly secured to the case of the gauge and to which is anchored one end of the Bourdon tube 4, or an equivalent pressure-responsive element, which moves in response to variations in internal pressure and which thereby actuates the index or pointer 5 by means of an appropriate gauge movement (not shown).

The gauge is here illustrated as mounted upon a casing or housing 6 having the vertically elongate chamber 7 which communicates at all times by means of a passage 8 with a source of pressure fluid whose pressure is to be indicated by the gauge. This casing or housing 6 may thus be regarded as constituting a part of a vat, tank, conduit or other receptacle for pressure fluid, but as here illustrated is provided at its lower end with a threaded nipple concentric with the passage 8 and which is designed to be screwed into a threaded socket in the pressure fluid receptacle so that the casing 6 with the gauge may be removed as a unit if desired.

The upper end 10 of the casing or housing 6 is provided with an internally screw-threaded bore forming a continuation of the chamber 7 and which receives an externally threaded plug 11 which is here shown as forming a part of an adapter device 12, the upper part of which has an internally screw-threaded socket 13 for the reception of the nipple 2 of the gauge. While the adapter 12 here illustrated is desirable, since it facilitates the assembly of the protector device with gauges of conventional type, it is contemplated that the adapter, as such, may be dispensed with provided the gauge itself be furnished with parts corresponding to those portions of the adapter now about to be described and which are designed to cooperate directly with the protective device.

As here illustrated the plug portion 11 of the adapter is provided with a downwardly extending stem 14 (Fig. 2ª) of a lesser diameter than the plug 11 and which terminates in a head member 15 of larger external diameter than the stem, thereby providing a substantially horizontal shoulder 16. Preferably the head is downwardly tapered, as indicated at 17, below the shoulder 16.

An axial passage 18 leads from the socket 13 down through the plug 11 and through the stem 14 and head 15, this passage 18 being diametrically enlarged at 19 to provide a chamber for a pulsation dampening device, here illustrated as comprising one or more pervious compressible disks 20 held in place and under proper compression by an axially apertured screw 21.

In accordance with the present invention the pressure flask, as illustrated in Figs. 2 to 8 inclusive, consists of a unitary mass of organic material of elastically tenacious and resilient character resembling rubber in its general physical characteristics. While rubber may be employed for some purposes, rubber has the disadvantage of deteriorating when in contact with oil, petroleum or similar substances, and for this reason and in order that the pressure flask may be of substantially universal application, it is preferred to make it from one of the synthetic rubbers, for example, polymer products of chloro-2-butadiene-1,3 as more fully described for example in the patent to Williams No. 1,950,436, dated March 13, 1934, or polymers of vinyl halides mixed with appropriate plasticizers, for instance tricresyl phosphate, as more fully described for example in the patent to Seman No. 1,929,453, dated October 10, 1933. Their general properties are well known and such substances, sold under such trade names as Neoprene or Koroseal, are common and well known articles of commerce.

Preferably the pressure flask 22 is formed by a moulding operation and the resultant flask is a unitary mass of material comprising the elongate body portion 23 and the relatively short neck portion 24. The body portion is preferably smoothly rounded at its lower end 25 and permanently closed at this end, the body portion being hollow to provide the interior chamber 26 (Fig. 2) which is of substantial capacity, the only entrance to this chamber 26 being through the cylindrical passage 27 (Fig. 6) in the neck portion.

Preferably the body portion 23 of the flask tapers downwardly and is transversely flattened so that it is wider as viewed in Fig. 3 than in Fig. 4. This flattening of the body portion may be to the extent of providing substantially flat opposed surfaces 28 and 29, forming the front and rear of the flask, such surfaces being joined by outwardly convex edge surfaces. This flattened form of body portion makes the device much more sensitive and more uniform in response to external pressure variation than though it were of circular transverse section, since the tendency of externally applied pressure is to cause the surfaces 28 and 29 to move inwardly toward each other in more or less parallel relation while the outwardly convex edges merely bow outwardly to a sharper curvature as the sides 28 and 29 approach. As contrasted with this, a pressure flask of circular transverse section offers substantial resistance to compression at every point, by reason of its arched contour, so that except the flask yield unsymmetrically inward at some abnormally weak point, the contraction of its interior chamber must be due purely to mass compression of the substance forming its walls.

Since the external diameter of the neck 24 is less than the maximum transverse dimension of the body portion at its junction with the neck, a shoulder 30 is formed at this point. Preferably the flask is also furnished with a radial outwardly directed flange or peripheral rib 31 at the upper end of the neck.

To assist in uniting the pressure flask to its associated parts, it is preferred to provide a constrictive ring designed to embrace the neck 24 of the flask in the space defined by the shoulder 30 and the flange 31. A preferred form of constrictive ring 33 is illustrated in Fig. 7. This ring consists of a length of helically coiled spring wire 34, the ends of the coil being connected at 35 so as to form a continuous ring. Such a ring is inherently capable of diametrical expansion in response to radially directed outward force.

The ring 33 is of such normal internal diameter as to fit snugly about the neck 24 of the flask, or, if preferred, to exert substantial constrictive pressure about said neck when mounted thereon. By expanding the ring 33 it may be slipped over the flange 31 and thus readily disposed upon the neck of the flask, as shown in Fig. 8.

In assembling the flask with the gauge so as to provide the latter with the desired protection in accordance with the invention, the ring 33 may first be assembled with the flask, as shown in Fig. 8, and then the neck of the flask may be forced over the head 15 of the adapter device, the beveled end surface 17 of the head 15 facilitating such assembly. During such assembly the spring ring 33 expands to allow the head 15 to pass through the neck of the flask, but as soon as the head enters the chamber 26 in the body portion of the flask the ring 33 becomes effective to contract the neck, or to assist the neck in contracting, so as very snugly to embrace the stem of the adapter.

The plug 11 of the adapter is now screwed into the bore in the part 10 of the rigid casing 6, with the pressure flask disposed in the chamber 7 of the casing. The diameter of the chamber 7 of the casing 6, at least at that annular portion thereof at which the spring 33 is located when the parts are assembled, is such that the inner surface of the casing 6 contacts the outer periphery of the ring 33. Since the casing 6 is rigid and since such annular portion thus contacts the ring 33 around its entire periphery, it is now impossible for the ring 33 to expand diametrically, no matter how great the force which may be exerted by the pressure fluid in attempting to enter between the flask and the stem 14. The flask and adapter are thus securely and reliably united in leakproof engagement.

After the flask has been threaded over the stem 14, the space defined by the chamber 26, the passage 18, the interior of the Bourdon tube, and other communicating spaces is solidly filled with oil, glycerin or other suitable pressure-transmitting mobile liquid.

The nipple 2 of the gauge may now be screwed into the socket 13 of the adapter and the casing 6, if not already mounted upon the vat or other pressure receptacle, is now secured in place and the protector device, comprising the flask 22 and its associated parts is ready to perform its intended function.

In Figs. 9 to 12 a pressure flask of modified form is illustrated, such flask 22$^a$ being moulded or otherwise formed from material similar to that above described with respect to the flask 22. This flask comprises the downwardly tapering body portion 26$^a$ which is smoothly rounded and permanently closed at its lower end and which has the passage 27$^a$ leading up through its neck portion 24$^a$. The body portion in this instance is also somewhat wider transversely (as viewed in Fig. 9) than from front to rear (as shown in Fig. 10) so that its inner chamber 26$^a$ is of more or less elliptical transverse contour (Fig. 11), but in this instance the front and rear surfaces are not actually flat. In this case there is provided a peripheral shoulder 30$^a$ at the junction of the body portion and neck, and the upper end of the neck is furnished with a radial flange or peripheral rib 31$^a$. The space between the parts 30$^a$ and 31$^a$ provides for the reception of a constrictive ring 33$^a$ which in this instance consists merely of a coil 33$^a$ of wire which is wrapped snugly about the neck, the several turns of wire forming this coil being of sufficient tensile strength so that the ring effectively prevents any diametrical expansion of the neck portion of the flask. Obviously, if desired, the diameter of the wire used may be such that when the parts are assembled, the ring 33$^a$ will bear against the inner surface of part 10$^a$ so that diametrical expansion of the ring is prevented, as described with reference to the spring ring 33. The interior wall 24$^\times$ of the neck portion of the flask is preferably smoothly cylindrical initially. As illustrated in Fig. 12, the casing 6$^a$ with its chamber 7$^a$ and attaching nipple 9$^a$, is substantially like the casing 6 above described. The adapter 12$^a$ is likewise generally similar to the adapter 12, having the plug portion 11$^a$ which has screw-threaded engagement with the upper part 10$^a$ of the casing. However, in this instance the stem portion 14$^a$ of the adapter does not have the enlarged terminal head, but is externally screw threaded. In assembling the flask 22$^a$ with this adapter, the constrictive coil or ring 33$^a$ is first wrapped around or applied to the neck of the flask and then the flask is assembled with the stem 14$^a$ by screwing it onto the latter, the threads on the stem acting as a tap to cut corresponding threads into the substance of the flask. It will be noted that the constrictive ring 33$^a$ prevents any expansion of the neck of the flask, so that in thus screwing the flask onto the stem the action is substantially the same as though the flask were of metal. A very firm, secure and leaktight union results.

In Figs. 13, 14 and 15 a further modification is illustrated wherein the pressure flask 22$^b$, also made of material similar to that above described, is of unitary construction comprising the closed smoothly rounded lower end 25$^b$ and having the chamber 26$^b$ in its body portion and being provided with a neck at 24$^b$ and a radial flange at 31$^b$. In this instance, however, the body portion is of substantially circular transverse section. The casing $6^b$ with its attaching nipple $9^b$ corresponds in general to the casing 6 above described. In this instance, however, the part 10 of the casing 6 is replaced by a radial flange $10^b$ which is designed for engagement with a corresponding radial flange $11^b$ of the adapter device $12^b$, the flanges $10^b$ and $11^b$ being furnished with openings for the reception of clamping bolts 39. The body of the casing $6^b$ is provided with a pressure fluid-receiving chamber $7^b$ the inner surface of which is preferably provided with a plurality of peripherally spaced longitudinal ribs 37. In actual use the interior of the pressure flask is sometimes filled with fluid at such a pressure as would cause it to expand in to close contact with the wall of the chamber $7^b$, and if the wall of the chamber were smooth such contact of the flask with the wall would make the gauge unresponsive to pressure fluctuations at the inlet of the chamber $7^b$ until the pressure in the flask had been counterbalanced. The ribs 37 hold the flask away from the wall of chamber $7^b$ so as to form a plurality of channels through which pressure fluid from the inlet may enter and contact a large part of the area of the outer surface of the flask even when the latter is fully expanded. The chamber $7^b$ is enlarged at its upper end to form an annular recess 36 upon which is seated the flange $31^b$ of the pressure flask. This recess is of such depth that when the flange $31^b$ is placed in the recess and the clamping bolts 39 are tightened, the flange $31^b$ is placed under heavy compression. The adapter device $12^b$ is provided with a downwardly directed blunt stem portion $14^b$ which fits snugly within the neck portion of the flask, thus preventing any possible decrease in diameter of said neck portion. Thus when the bolts 39 are tightened and the flange 31 is placed under compression, a very reliable leaktight joint is formed between the flask and its associated parts. The adapter $12^b$ is provided at its upper part with a socket $13^b$ for the reception of the gauge nipple, and as here illustrated may comprise pulsation dampening means including a plug of porous fluid-pervious material filling a transverse duct which connects the passages $18^b$ and $18^c$. However, such pulsation dampening means may be omitted if desired, and in that event the passages $18^b$ and $18^c$ leading inwardly from the chamber $26^b$ and from the socket $13^b$, respectively, will merge directly with each other.

In Fig. 16 a further slight modification is illustrated wherein the casing $6^b$ is generally similar to that of Fig. 14 and the adapter device $12^b$ is likewise generally similar to that of Fig. 14. However, in this instance the pressure flask $22^c$ is furnished with the radial peripheral rib $30^c$ spaced from its upper radial flange $31^c$, thus providing a space for the reception of a constrictive ring $33^c$, here shown as a solid wire annulus. In this instance also the blunt stem portion $14^c$ of the adapter is furnished at 40 with a peripheral groove which sets off the lower or head portion of the stem from its upper part and which is disposed in the plane of the ring $33^c$. The inner surface of the chamber $7^c$ in the casing $6^b$ is of such a diameter at the region of the ring $33^c$ as to contact the ring $33^c$ about its entire periphery when the parts are assembled, providing a leak-preventing seal in addition to that resulting from the clamping of the flange $31^c$ between the casing and the adapter device.

While certain desirable embodiments of the invention have herein been disclosed and illustrated by way of example, it is to be understood that the invention is not necessarily limited to these precise arrangements, but is to be regarded as broadly inclusive of any and all modifications and arrangement of parts falling within the scope of the appended claims.

I claim:

1. The combination of a pressure-responsive instrument, including a pressure-sensitive element and mechanical parts actuated thereby, with a pressure flask of resiliently yieldable material, and means for connecting the flask to the instrument including a rigid stem member having a peripheral shoulder, the flask having a hollow body portion and a tubular neck, the stem fitting snugly within the neck with its shoulder disposed within the body of the flask, a ring embracing the neck of the flask, and a rigid annulus normally closely embracing the ring thereby to prevent diametrical expansion of the latter.

2. The combination of a pressure-responsive instrument, including a pressure-sensitive element and a movable part actuated thereby, with a pressure flask of resiliently yieldable material, and means for connecting the flask to the instrument including a rigid stem member having a peripheral shoulder, the flask having a hollow body portion and a tubular neck, the stem fitting snugly within the neck with its shoulder disposed within the body of the flask, a constricting ring embracing the neck of the flask and pressing the material of the neck radially inward against the stem, said ring being inherently expansible diametrically in response to internal pressure, and a rigid annulus normally closely embracing the constricting ring thereby to prevent diametrical expansion of the latter.

3. The combination of a pressure-responsive instrument, including a pressure-sensitive element and a movable part actuated thereby, with a pressure flask of resiliently yieldable material, and means for connecting the flask to the instrument including a rigid stem member, the flask having a hollow body portion and a tubular neck, the stem fitting snugly within the neck, a ring consisting of a length of helical coiled spring wire with its ends united, said ring embracing the neck of the flask with constrictive pressure, and a rigid annulus normally closely embracing said ring to prevent diametrical expansion of the latter.

4. The combination of a pressure-responsive instrument, including a pressure-sensitive element and a movable part actuated thereby, with a pressure flask of resiliently yieldable material, and means for connecting the flask to the instrument including a rigid stem member having a head of greater diameter than the stem, the flask having a hollow body portion and a tubular neck, the stem fitting snugly within the neck with its shoulder disposed within the body of the flask, a constricting ring embracing the neck of the flask, said ring being of resilient stretchable material and capable of being so diametrically expanded as to permit the neck of the flask with the ring embracing the same to be slipped over the head of the stem, and a rigid annulus normally embracing the ring to prevent such diametrical expansion thereof.

5. The combination with a pressure-responsive instrument, including a pressure-sensitive element and a movable part actuated thereby, and having a connecting nipple, of a pressure flask of resiliently yieldable material, said flask having a hollow body portion and a tubular neck, of an adapter having a socket for the nipple of the instrument, and a stem which terminates in a head of a diameter greater than that of the stem, the stem fitting within the neck of the flask with its head portion disposed within the body of the flask, a rigid casing removably secured to the adapter and having a chamber for housing the pressure flask, and a ring embracing the neck of the flask and normally holding it leaktight in contact with the stem, the inner surface of the wall of said chamber contacting said ring throughout its entire periphery when the casing and adapter are operatively assembled thereby to prevent diametrical expansion of the ring when the device is in use.

6. Apparatus of the kind including a conventional pressure gauge having an externally screw-threaded attaching nipple, a hollow, movable pressure-responsive actuating element which constitutes a portion of the wall of a closed fluid-receiving space, a pressure flask consisting of resiliently yieldable material having a neck and a hollow body, the interior of said body forming a part of said space, means providing a leakproof connection between the nipple of the gauge and the neck of the flask, and a body of mobile pressure-transmitting liquid substantially filling said space, characterized in that the leakproof connection between the gauge nipple and the flask comprises a part having a rigid stem which fits within the neck of the flask, a resilient constricting ring embracing the neck of the flask and holding it leaktight against the stem, and a rigid annulus housing said ring.

7. Apparatus of the kind including a conventional pressure gauge having an externally screw-threaded attaching nipple, a hollow, movable pressure-responsive actuating element which constitutes a portion of the wall of a closed fluid-receiving space, a pressure flask consisting of resiliently yieldable material having a neck and a hollow body, the interior of said body forming a part of said space, means providing a leakproof connection between the nipple of the gauge and the neck of the flask, and a body of mobile pressure-transmitting liquid substantially filling said space, characterized in that the leakproof connection between the gauge nipple and the flask comprises a part having a tubular rigid portion which fits within the neck of the flask, a constricting ring embracing the neck of the flask and holding it leaktight against said tubular member, the neck of the flask having spaced positioning elements defining between them a space for the reception of the ring, the ring being inherently capable of diametrical expansion, and a rigid annulus normally housing the ring.

8. An adapter for use in connecting a conventional pressure gauge having an externally screw-threaded nipple to a pressure flask having a tubular neck and a hollow body portion of larger transverse dimensions than the neck, said adapter comprising a socket portion internally screw threaded for the reception of the gauge nipple, and a tubular stem axially aligned with the socket, said stem terminating in a head of a diameter greater than that of the stem, the stem being designed to fit within the neck of the flask with its head portion disposed within the body of the flask.

9. A pressure flask for use with a pressure-responsive instrument, including a pressure-sensitive element and a movable part actuated thereby, said flask consisting of a unitary seamless mass of resilient organic oil-resistant material and including a hollow downwardly tapering body portion permanently closed at its small end, said small end being smoothly rounded, the opposite end of the flask being open, the larger end portion of the flask being substantially cylindrical and circular in transverse section and having an integral outwardly directed flange.

10. A pressure flask for use with a pressure-responsive instrument, including a pressure-sensitive element and a movable part actuated thereby, said flask consisting of a unitary seamless mass of resilient oil-resistant organic material and including a substantially conical downwardly tapering hollow body portion whose small end is smoothly rounded and permanently closed, the opposite end being open, the latter end portion of the flask having a pair of spaced elements defining between them a space for a constricting device.

11. A pressure flask for use with a pressure-responsive instrument, including a pressure-sensitive element and a movable part actuated thereby, said flask consisting of a unitary seamless mass of resilient organic material and including a hollow body portion one end of which is smoothly rounded and permanently closed, the body tapering toward the closed end and being of flattened transverse section, the opposite end of the flask being open, the latter end portion of the flask being substantially cylindrical and of circular transverse section and having shoulders defining between them a space for a constricting element.

12. An adapter for use in connecting a conventional pressure gauge having an externally screw-threaded nipple to a pressure flask, said adapter having a socket portion internally screw threaded for the reception of the gauge nipple, and parts operative to provide a leak-tight connection between the adapter and the flask, the adapter having a chamber for housing the flask, said chamber having an inlet, the inner surface of said chamber having spaced ribs so constructed and arranged as to admit pressure fluid from the inlet to enter between the inner surface proper of said chamber and the exposed exterior surface of the flask.

13. A pressure flask for use with a pressure-responsive instrument which includes a pressure-sensitive element and a movable part actuated thereby, said flask consisting of a unitary seamless mass of resilient oil-resistant organic material and including a substantially conical downwardly tapering hollow body portion whose smaller end is permanently closed and smoothly rounded, the larger end of the flask being open, said larger end being of substantially circular transverse section and having a radial, external flange whose upper and under surfaces are substantially flat and parallel, the vertical thickness of the flange being substantially as great as that of the wall of the body portion of the flask.

FRANK H. HOPKINS.